United States Patent [19]

Hopper et al.

[11] Patent Number: 5,493,283
[45] Date of Patent: Feb. 20, 1996

[54] LOCATING AND AUTHENTICATION SYSTEM

[75] Inventors: Andrew Hopper; Roy Want; Roger M. Needham; David J. Wheeler, all of Cambridge, Great Britain

[73] Assignee: Olivetti Research Limited, Cambridge, United Kingdom

[21] Appl. No.: 339,643

[22] Filed: Nov. 14, 1994

Related U.S. Application Data

[63] Continuation of Ser. No. 85,670, Jun. 30, 1993, abandoned, which is a continuation of Ser. No. 748,531, Sep. 16, 1991, abandoned, which is a division of Ser. No. 590,012, Sep. 28, 1990, abandoned.

[51] Int. Cl.[6] ............................................. H04Q 7/00
[52] U.S. Cl. ........................... 340/825.34; 340/825.44; 340/825.31; 380/23
[58] Field of Search .................. 340/825.34, 825.44, 340/825.54, 825.55, 825.49, 825.31, 825.69, 825.72; 379/55, 62, 92, 201, 210, 211, 196; 455/58; 380/23, 25

[56] References Cited

U.S. PATENT DOCUMENTS

| | | | |
|---|---|---|---|
| 3,337,992 | 8/1967 | Tolson | 340/825.31 |
| 4,281,215 | 7/1981 | Atalla | 340/825.34 |
| 4,652,860 | 3/1987 | Weishaupt et al. | 340/825.31 |
| 4,731,841 | 3/1988 | Rosen et al. | 380/23 |
| 4,779,090 | 10/1988 | Micznik et al. | 340/825.31 |
| 4,819,267 | 5/1989 | Cargile et al. | 380/23 |
| 4,837,568 | 6/1989 | Snaper | 340/825.49 |
| 4,850,018 | 7/1989 | Vogt | 380/23 |
| 4,935,962 | 6/1990 | Austin | 380/25 |
| 5,055,701 | 10/1991 | Takeuchi | 340/825.69 |
| 5,142,396 | 8/1992 | Divjak et al. | 340/825.72 |

Primary Examiner—Donald J. Yusko
Assistant Examiner—Edwin C. Holloway, III
Attorney, Agent, or Firm—Lee, Mann, Smith McWilliams, Sweeney & Ohlson

[57] ABSTRACT

A system for locating any mobile body of a plurality thereof within a predetermined environment, wherein each mobile body carries a transmitter (10 to 18), each transmitter producing a unique identifying signal, and a plurality of receivers (20 to 32) located in a corresponding plurality of defined regions in the environment, each receiver incorporating a FIFO buffer memory (28) into which carrier identifying data is inserted and a controller for interrogating the receiver means in turn to link the identification data with location data. (FIG. 1). A carrier authentication system is also described.

6 Claims, 5 Drawing Sheets

LOCATING AND AUTHENTICATION SYSTEM

This application is a continuation of application Ser. No. 08/085,670, filed Jun. 30, 1993, abandoned, which is a continuation of application Ser. No. 748,531, filed Sep. 16, 1991, abandoned, which is a division of application Ser. No. 590,012, filed Sep. 28, 1990, abandoned.

FIELD OF INVENTION

This invention concerns a system for locating the whereabouts of mobile carriers (which may be-vehicles or people or animals or any movable items) within a predetermined environment. The invention also concerns a method determining and authenticating the movement of any particular carrier from one region to another of the predetermined environment.

BACKGROUND OF THE INVENTION

Paging systems are known whereby a centrally located operator can call up a person by name over a tannoy system.

Radio paging systems are also known whereby in a similar manner, but with greater secrecy, each one of a group of people carrying individual radio receivers can be called up using a radio transmitter to transmit an appropriate call up signal to cause the appropriate one of the radio receivers to emit a signal (either audible or visual or both) to thereby alert the carrier to make contact with the central operator.

Both systems rely on a telephone system within the environment within which the called up people are located to enable the paged person to make contact with the central operator.

Neither system however enables the operator to determine in advance whether any particular carrier is actually within the environment and where, in the environment, the carrier is actually located at any particular time. In each case the operator only becomes aware of whether the carrier is within the environment let alone where the carrier is located, after the carrier has made contact with the operator by establishing a telephone link using a locally situated telephone receiver.

It is one object of the present invention to provide a system by which a central controller (which may be a person or programmed computer), can rapidly determine whether a particular carrier is located within a given environment and if so where the carrier is located within the environment, to thereby enable the controller to make contact with the carrier by using a standard internal telephone system to cause a telephone near to where the carrier is located to ring. In this way the controller can route an incoming telephone call from another person (who may be within the environment or calling in from outside, as for example by using the public telephone network), directly to a telephone convenient to where the carrier is actually located at the time the call is received.

It is a further object of the present invention to provide a system by which a centrally located controller (which may be a person or programmed computer or the like) can grant or deny access to a carrier to a restricted region of a predetermined environment.

It is a subsidiary object of the invention to provide a system to record the occasions where the carrier gains access to some or all of selected regions within an environment.

SUMMARY OF THE INVENTION

According to one aspect of the invention in a system for locating the whereabouts in a predetermined environment of each of a plurality of carriers, comprises:

a) Transmitter means on the carriers for transmitting identifying signals, each transmitter producing a unique signal;

b) A plurality of receiver means located in each of the corresponding plurality of separate defined regions making up the predetermined environment and each adapted to receive any of the unique identifying signals should any of the transmitting means be within range, each receiver means including a FIFO buffer memory to which carrier identifying data is inserted whenever a transmission from a carrier is received, and c) A controller adapted to interrogate each of the plurality of receiver means in turn to record the identifying data (obtained from the FIFO buffer memories as they are addressed), with regional data, thereby linking the carrier identifying data with positional identifying data relating to the environment.

Preferably the transmitter means transmit identifying signals for short durations of time which are well spaced by larger intervals of time, and preferably a degree of randomness is introduced into the spacing period so as to reduce the risk of simultaneous transmissions.

In a system in which incoming telephone calls which contain a unique extension code are to be routed automatically by a programmed computer which is to use the extension code to identify the carrier to whom the call is to be routed, the computer operates so as to determine the current positional data linked to the carrier data associated with the extension code and thereby enable the region (and therefore a convenient telephone extension) to be identified, whereby the incoming call can be routed to that telephone extension.

In a system in which incoming telephone calls are intercepted by a human operator, display means may be provided such as a screen or mimic diagram or the like and input means is available to the operator to enter data which identifies the carrier to whom the call is to be routed, and a programmed computer operates in response to such input to display on the screen (or otherwise), information which may enable the operator to ascertain the region in which that carrier was last located or, may advise the operator of the appropriate telephone extension number to which to route the calls.

Conveniently the transmitter means includes an infra-red source and driver therefor and the receiver means includes an infra-red sensitive transducer (such as an infra-red sensitive diode) and signal amplifier.

Preferably each transmitter means includes a PPM encoding device which drives an infra-red emitting diode, and switch means, and a pulse generator and timing circuit means are provided for determining the intervals during which the diode is to transmit coded information.

By arranging that each of a plurality of transmitters to be used by carriers within a given environment each transmits a uniquely coded signal for only a very short period of time which itself is relatively randomly determined, so each receiving means will in general only receive a single carrier transmission at any instant in time and each carrier can be uniquely identified and its position determined as aforesaid.

If it is essential that two transmissions from carrier mounted transmitter units never occur simultaneously, a form of time division and synchronisation must be built into each carrier mounted transmitter to prevent any such occurrance. Thus is one form of such a transmitter, a crystal controlled timing device is incorporated which is set to produce trigger signals for releasing coded carrier data from the transmitter on a repetitive synchronous basis, which can be pre-set within a series of time slots so that each transmitter unit only transmits coded carrier data during one of said time slots within each repetitive period of time.

Alternatively receiver means may be incorporated within each transmitter means and a synchronous timing signal may be transmitted throughout the whole environment by transmitter means associating with each said receiver located within each region within the environment, so that all of the receivers are locked into synchronous operation and each receiver is pre-programmed to transmit coded data relating to the carrier in a strictly defined period of time following each synchronous signal, each of the periods of time being different for the different transmitters to thereby again eliminate the possibility of duplication of transmission within any given region.

The components making up each transmitting means may be miniaturised and packaged together with a miniature battery onto a badge or device which can be worn or carried externally by a person or mounted on a vehicle or other item or animal which is to be monitored.

Such receiver means conveniently comprises a PPM decoder for generating digital data for storing in the FIFO memory and a controller and an address ROM into which address data is entered on installation, uniquely indicating in coded format the location of that receiving means relative to the overall environment.

Data in the FIFO memory of a receiving means may be read out by transmitting an address corresponding to that in the address ROM of the receiving means concerned, so causing the receiver controlled to interrogate the associated FIFO memory and to transmit the decoded carrier data stored therein, together with coded data indicating the identity (and therefore the location) of the receiving means.

A FIFO buffer memory is required in practice, to prevent data being lost if a number of carrier transmitter devices should transmit data in quick succession, and so that the interrogating loop can be interrupted for short periods without data loss.

The interrogation loop may be a 4-wire OR'd network operating at 4800 Baud.

In a development of the invention, an authentication system may be provided which comprises a similar transmitting means (carried for example on a badge carried by the mobile carrier) which is arranged to transmit a generally unforgeable signal and which includes receiving means by which it can be prompted to generate the unforgeable signal.

Typically a simple challenge-response protocol is employed and each receiving means is adapted to receive and transmit infra-red PPM signals and has stored in a memory associated therewith 1. a publically known unique identifier, and
2. a secret unique password, and each of the said receiving means (previously referred to) can have access to information linking the passwords and the identifiers.

In addition, each receiving means incorporates transmitting means and is arranged to transmit a challenge signal in the form of a random number upon receipt of a carrier data transmission from a transmitter receiver unit carried by a mobile carrier.

Any carrier transmitting means (which for the purpose of the challenge is also adapted to receive signals) receiving a challenge signal is arranged to combine the received random number with its own unique password ( expressed as a numerical word ) and the composite number may be fed into a one way function device, which provides a response in such a way that the password cannot be derived from the out put of the device.

By arranging that the carrier transmitting means appends its own publically known unique identifier to the response signal, a receiving station can then identify the identity of the interrogated carrier device by using the identifier to look up the password (for example in a look-up table) to perform the same function (in essence) on the carrier device.

If the one way function is publically known, then if the response in the carrier device is the same as that produced by the receiving means, then the identity must be valid and the receiving means may be arranged to generate an authentication signal, for example, to enable a door to be opened.

A hardware driven one way function device can be constructed using an exclusive-OR function and a fixed look up table in combination with the challenge.

The invention will now be described by way of example with reference to the accompanying drawings.

DETAILED DESCRIPTION OF THE DRAWINGS

Figure 1:
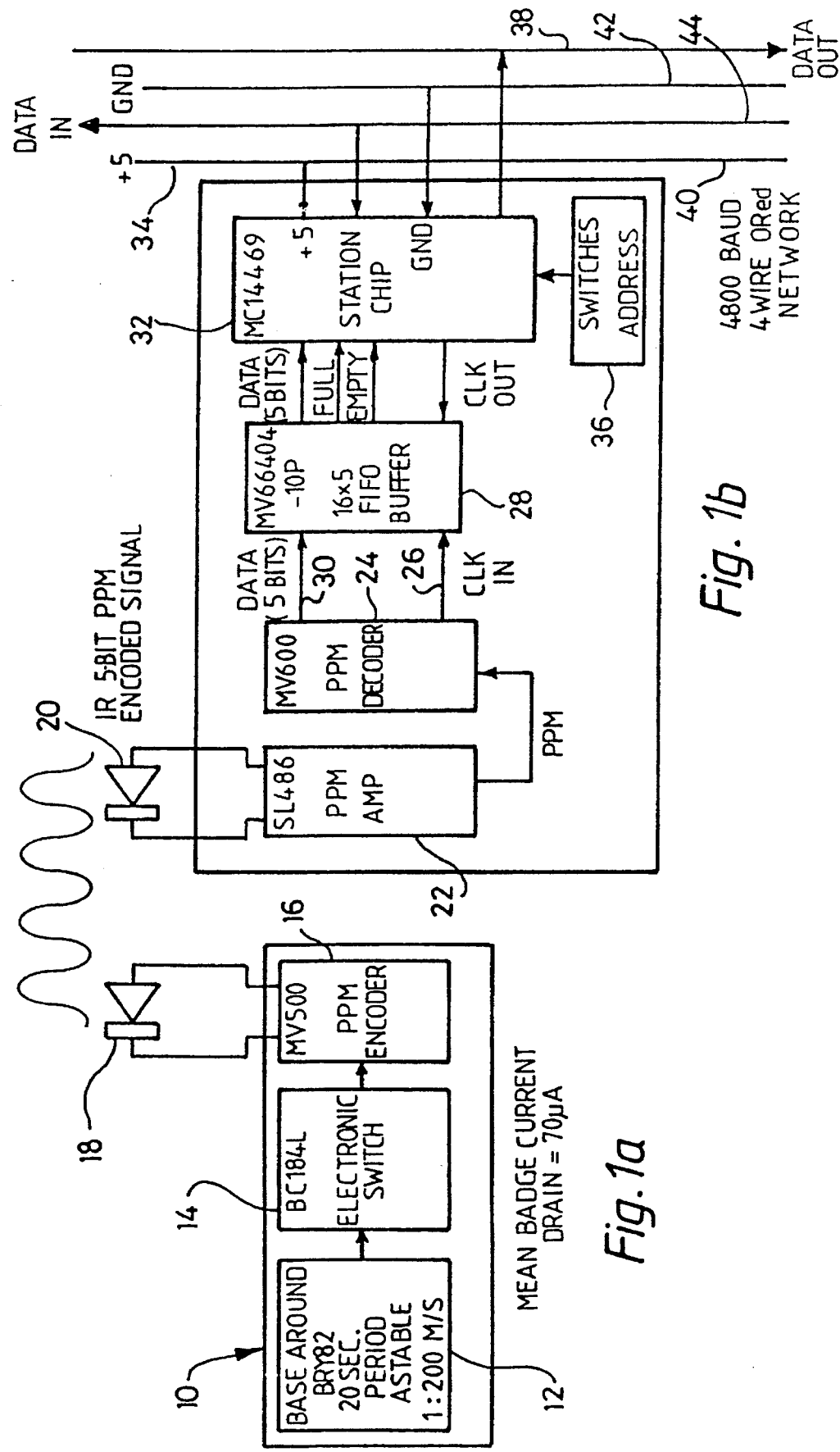
FIGS. 1a and 1b are a block schematic diagram of a mobile carrier position locating system embodying one aspect of the present invention.
Figure 2:
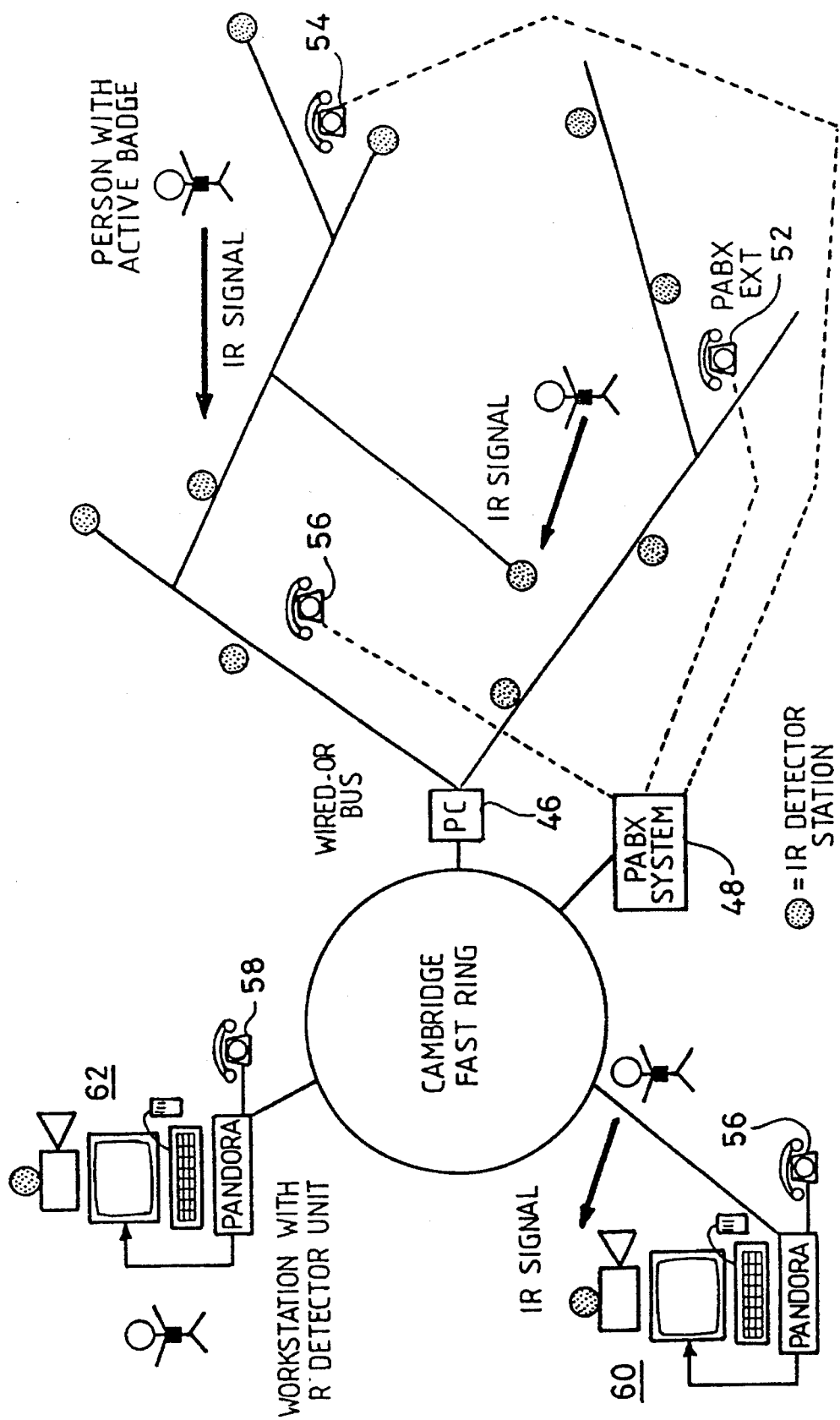
FIG. 2 is a schematic diagram showing how a plurality of receivers may be connected to a central processor and via a data network inter alia to a PABX and other work stations in a work environment.

In FIG. 1 the essential parts of a mobile "badge" transmitter are shown in FIG. 1a and likewise the essential parts of one of the zone receivers are shown in FIG. 1b, such as are employed in a badge position locating system incorporating the first aspect of the invention. In the overall system a receiver such as shown in FIG. 1b is located in each zone to be interrogated and is hard wired via a multi-path highway to a central processor for inter-connecting telephones in a PABX system, such as shown in FIG. 2.

As shown in FIG. 1a each transmitter 10 comprises a battery power supply (not shown) for powering a 20 second period astable multi-vibrator 12 for producing pulses having 1:200 mark to space ratio.

The multi-vibrator is based around a BRY62 device and provides control pulses for operating an electrical switch 14 based on a BC 184L device. Switch controls are device type MV500 arranged as a PPM encoder 16 for driving an infra-red transmitting element 18 such as an infra-red emitting diode.

Each receiver unit comprises an infra-red detector 20 which feeds the input to a PPM high gain signal amplifier 22 based on a device type SL486, the PPM output of which is supplied to a PPM decoder 24 based on the device type MV600. The latter provides a clock pulse signal along a path 26 to a 16×5 FIFO buffer store 28 based on device type MV6640410P, to which 5-bit data is supplied to the data input of the device via path 30.

FIFO buffer store 28 is also triggered by clock pulses from a central processor device 32, such as device type MC14489, and delivers the 5-bit data words to the data input terminal of the processor device 32. The processor also receives control signals denoting when the FIFO is FULL or EMPTY.

The processor 32 is powered from a 5 volt line 34 and is connected to the negative side of a supply such as a mains powered power supply unit (not shown).

A station address is set up by pre-set switches 36 and the processor 32 is programmed to transfer the data stored in the FIFO buffer 28 to a data bus 38 (forming part of a four-wire highway). The latter comprises a 5 volt line 40, a ground line 42 and a second data line 44.

Referring again to FIG. 2, the central processor is shown as a personal computer 46 programmed to deliver a sequence of station addresses along the data line 44. When a detector station processor 32 receives a station address signal corresponding to the address as set up by its associated switches 36, the data in its associated FIFO memory is transmitted via the processor 32 to data line 38 and thence to the central processor PC46.

The latter is programmed to link the zone address signals with the badge identifying signals from each FIFO memory, within a memory associated with the PC 46, so that badge signals are associated with particular zone identification signals and the PC can be interrogated in a conventional manner to indicate the zone within which any particular badge, or group of badges, is currently located.

As shown in FIG. 2 the central processor PC46 can be arranged to set up ringing and speech paths via a PABX 48 to any one of a number of telephone extensions 50, 52, 54, 56 and 58. A ring bus such as Cambridge Fast Ring may be employed to link work stations such as 60 and 62 to the central processor 46 and the same ring may be employed to transmit signals to and from the telephone extensions 56 and 58, as well as data to and from the work stations 60 and 62, and the PC46—and if appropriate, via the PABX, to external telephone lines using modems.

In use the system allows incoming external calls for a particular person, routed via the PABX 48, to transmit a ringing signal to the telephone extension in the zone within which the identified person is located. This is achieved by allocating a unique identification number to each person to whom calls are to be so directed, and to issue to that person a badge having as its "call sign" the same number. An incoming call including that number (corresponding effectively to a telephone extension number) is decoded by the PC46, and the memory within the PC 46 consulted for the same number. When found, the zone identification for that badge number is noted and a ringing tone is transmitted to a telephone extension within the identified zone. (Where there is only one telephone in each zone, the routing is relatively straightforward and can be completed (or not) depending on whether the telephone extension is busy or free. Where more than one telephone is located in each zone (as will normally be the case) the routing will be slightly more complicated but can be arranged using some form of hierachy, or simply random selection, of available extensions).

Altervatively the routing of the incoming call may be by a telephone operator who can interrogate the PC46 using the badge number of the required person, to call up the zone within which they can be found, before selecting the telephone extension to be rung, to enable the incoming call to be connected to a telephone in close proximity to the called person.

Figure 3:
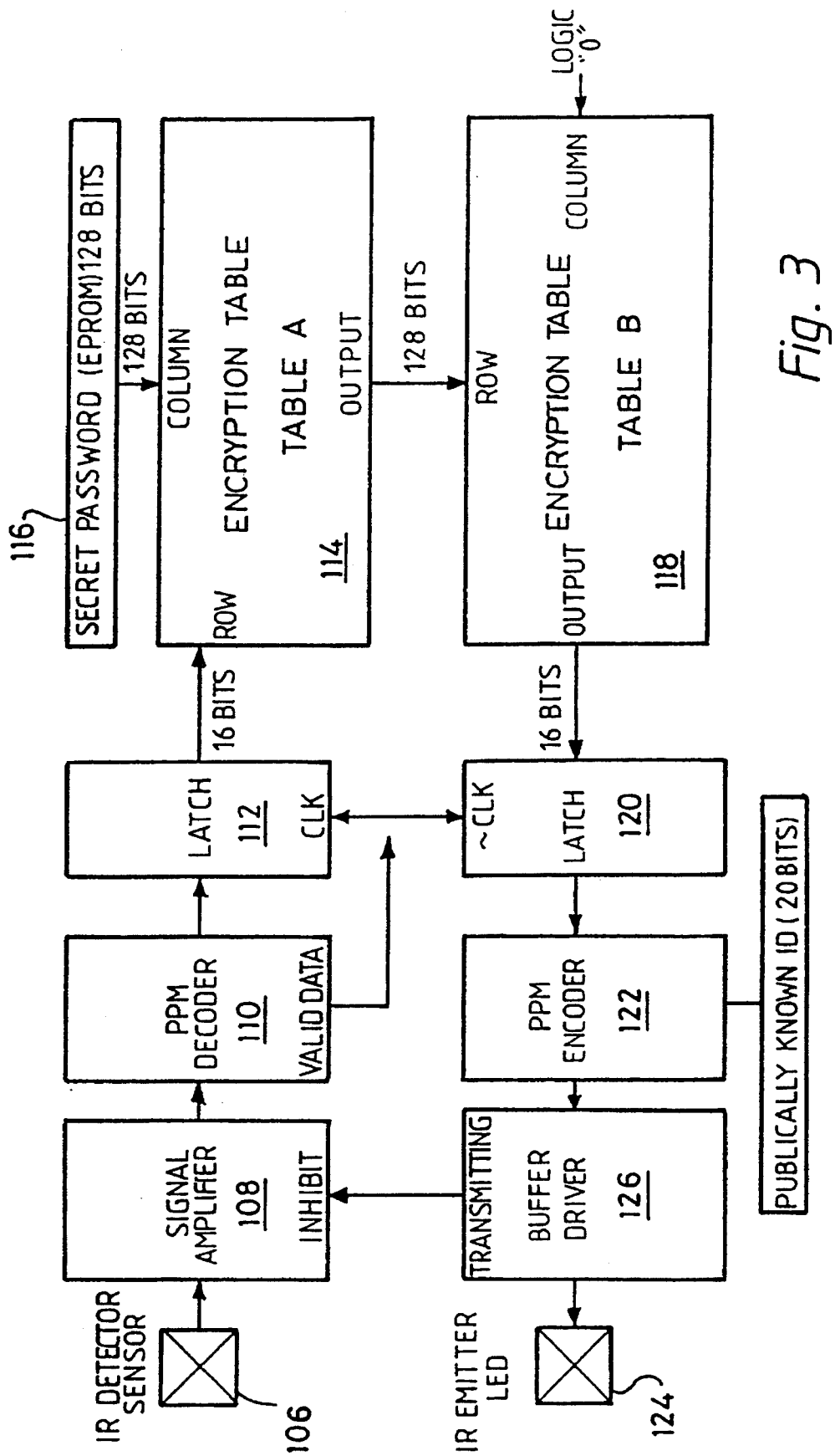
FIG. 3 is a block schematic diagram of a challenge and authentication system incorporating the second aspect of the invention.
Figure 4:
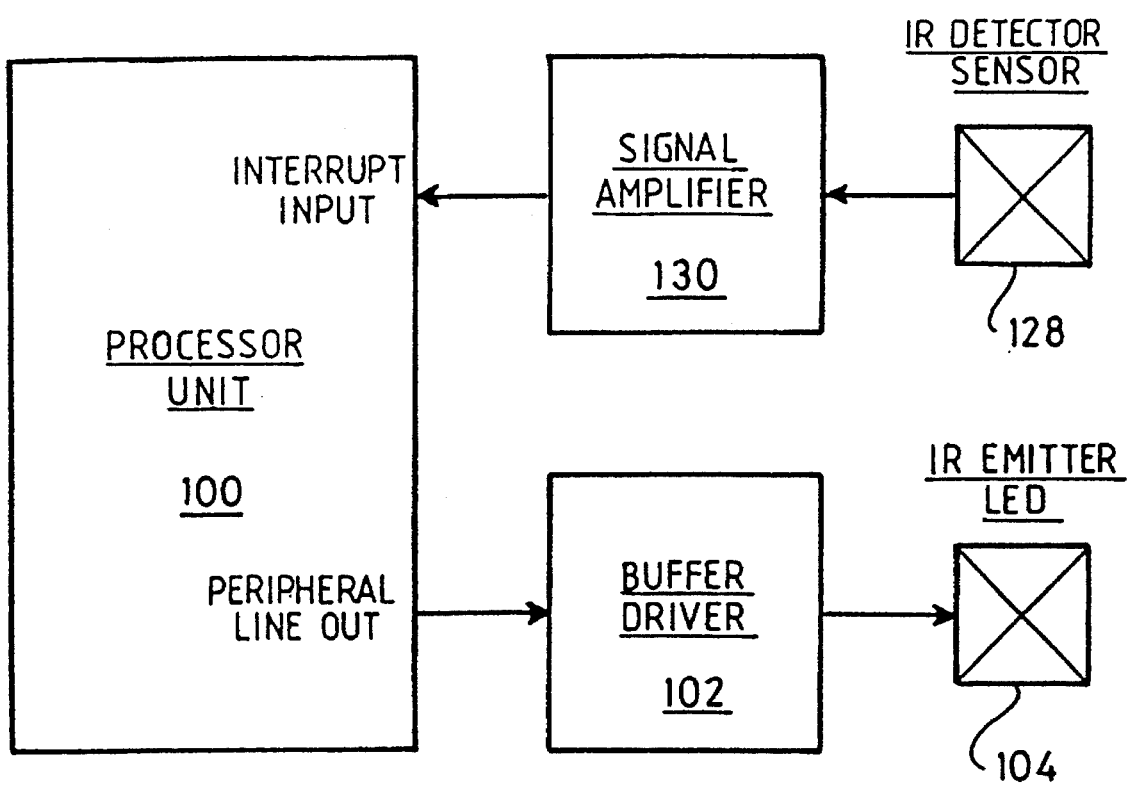
FIG. 4 is a block schematic diagram of a base station for the system of FIG. 2.
Figure 5:
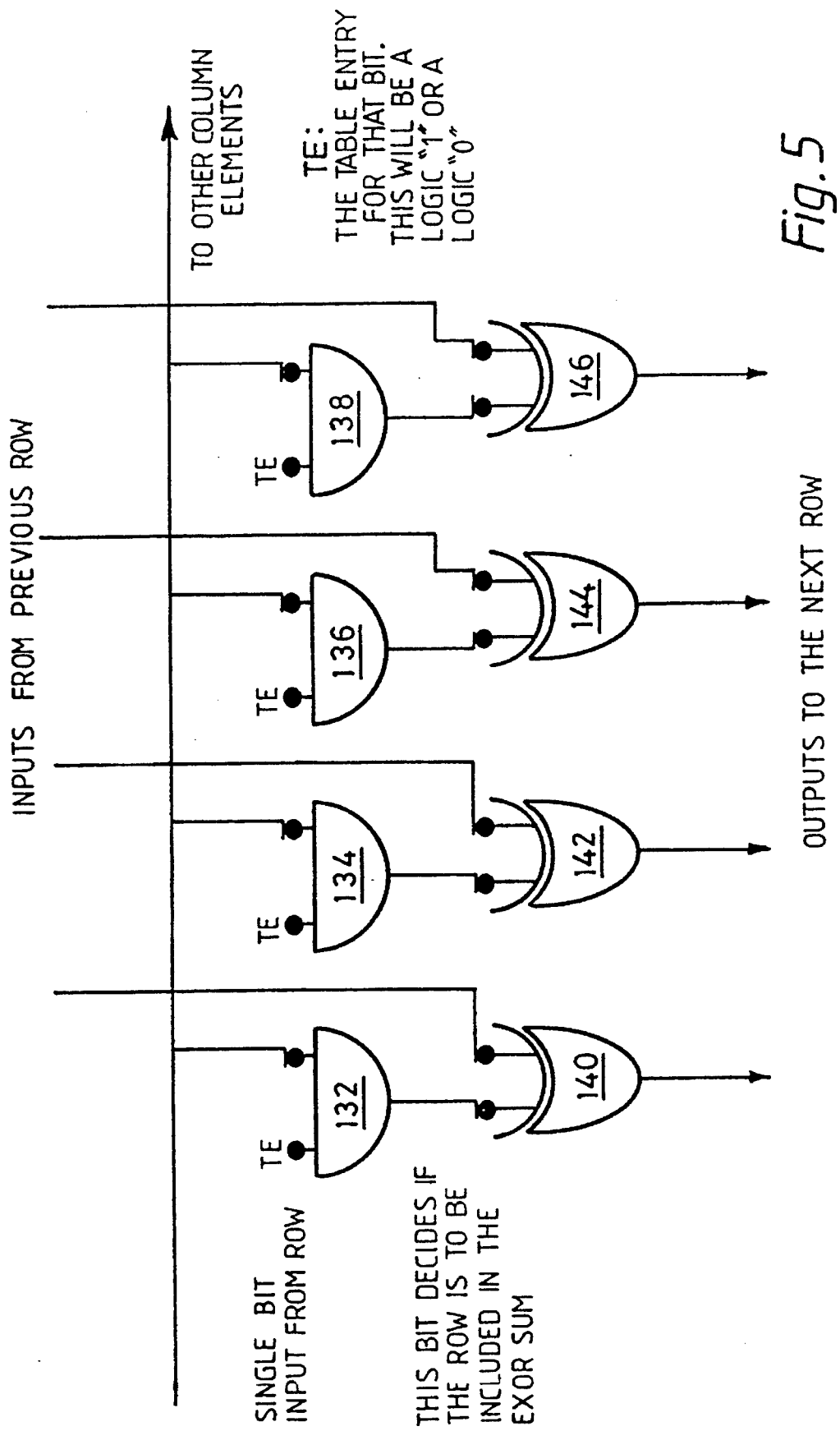
FIG. 5 illustrates the design of part of the encryption tables shown in FIG. 2.

FIGS. 3 to 5 illustrate a related system which provides an unforgeable badge for use in a system for authenticating the user of the badge by requiring a correct password to be inserted by the user, in answer to a challenge. The object of the system is to make it very difficult if not impossible for an authorised person who gains access to one of the badges to use the badge in an unauthorised manner. Likewise the invention also makes it difficult to electronically interrogate the signals transmitted to and received from such a badge to thereby enable a duplicate unauthorised copy of the badge to be made.

In the system shown a processor 100 (see FIG. 4) in the base station generates a 16-bit random number for transmission via a buffer driver amplifier 102 as a PPM signal from an infra-red light emitting diode, or the like transmitter, 104. These PPM signals will be detected by an infra-red detector 106 on a badge if a person wearing the badge is within the vicinity of the base station and transmitter.

The received signal will normally be amplified by a signal amplifier 108 and decoded by a PPM decoder 110. If found to be valid, the decoder presents the serially received pulses as a parallel 16-bit word to a latch 112 from where the 16-bit word is presented to 16 rows of an encryption table 114 having 128 inputs supplied with 128 1's and 0's from an EPROM 116, the particular series of 1's and 0's comprising a secret password.

The 16-bit parallel data word (supplied to the 16 rows of the table) is exclusively OR'd with the 128 bit password (supplied to the 128 inputs), if there is a 1 in the corresponding row of the table. Since the rows which are set to 1 (as opposed to 0) are determined by the particular received 16-bit random number, the output from the table is a scrambled version of the 128-bit secret password, the scrambling being determined by the particular random number transmitted from the base station.

The 16 rows of a second encryption table 118 are exclusively OR'd with 0 if there is a corresponding 1 in the column output from table 114. The effect of table 118 is to produce 16 output bits from the 128 inputs.

It is to be noted that the security of the system is bound up with the number of bits in the secret password stored in the EPROM 116, and this can be improved by increasing the number of bits (for example from 128 to 256 or more). It is of course necessary to provide larger encryption tables if larger passwords are employed.

The 16-bit encrypted number can be latched via latch 120 into a PPM encoder 122 which combines the parallel encrypted signal with a 20-bit ID number transmitted by the badge to produce a serial number, having 16 bits followed by 20 bits, for driving an LED transmitter 124 via a buffer amplifier 126.

The latter produces an inhibit signal for inhibiting the amplifier 108 whilst the IR LED is transmitting.

The transmitted signal is received by the IR sensor/detector 128 of the base station (see FIG. 3) and the received signal is amplified by the signal amplifier 130 before being supplied to the interrupt input of the processor 100.

The processor includes within its memory both encryption tables 114 and 118, and a look-up table in which are stored the secret passwords in the EPROMS 116 of the badges against the ID numbers of the personnel allocated the badges, and possibly an additional secret PIN number.

The base station may be associated with, for example, a security door giving access to a secure region, and a keypad (not shown) may be provided adjacent the door, into which the users secret PIN number can be keyed by the user. Using this PIN in combination with the 20-bit ID number transmitted by the badge, the processor 100 can consult the look-up table and determine the secret password which should be stored in the EPROM 116 of the badge worn by that person. This password is then supplied to the column of the encryption table 114 (embodied within the processor 100) and the random number which was generated by the same processor (and is therefore available within the processor memory), is applied to the rows of the same encryption table 114 (embodied within the processor).

This results in the production of a 128 bit number for processing by the second encryption table 118 (embodied within the processor 100), to produce a 16-bit output word.

This 16-bit word is compared within the processor 100 with the 16-bit encrypted number received from the badge.

If the password in the EPROM 116 is the same as the password produced from the look-up table in the memory 100, the two 16-bit words will be identical—a situation which can readily be detected. If not, the only sensible conclusion is that the badge holder who has inserted the PIN on the keypad is either not wearing the correct badge, or has entered an incorrect PIN or both, and entry will be prohibited.

If the Keypad/PIN system is not used the processor 100 will only authenticate a badge and not the badge holder. In some instances this will be sufficient for an installation's security in the same way a conventional mechanical key system is sufficient, however it is imperative a badge holder maintains a high degree of care concerning the possesion of his/her badge. It should be noted that unlike a conventional mechanical key system an active badge, as described here, is extremely difficult to forge by examining either its composition or recording the signals it produces.

FIG. 5 shows the connections to part of the encryption table 114 and shows the single bit input from a row supplied to each of a plurality of AND gates 132 to 136 to whose other inputs are supplied the 1's and 0's.

The AND gate outputs form one input to a corresponding plurality of Exclusive OR gates 140 to 146 respectively.

The table entry inputs are the second inputs to each of the AND gates.

We claim:

1. An authentication system for verifying the identity of a mobile carder comprising a static base station comprising:

a processor unit for generating a random number;

memory means for storing said random number and a plurality of identification numbers: and an infra-red PPM transmitter for transmitting said random number in the form of a PPM signal;

wherein said mobile carrier comprises:

an infra-red PPM signal detector for detecting said PPM signal when said mobile carrier is within the vicinity of said static base station;

a signal amplifier connected to said infra-red PPM signal detector for amplifying said PPM signal;

a PPM signal decoder connected to said signal amplifier for decoding said PPM signal in the form of said random number;

a first latch for receiving said random number;

a memory wherein is stored a predetermined secret password;

a first encryption table connected to said memory and to said latch for generating a first encrypted number in response to said predetermined secret password and to said random number;

a second encryption table connected to said first encryption table for generating a second encrypted number in response to said first encrypted number;

a second latch for receiving said second encrypted number;

a PPM encoder connected to said second latch for combining said second encryption number with an identification number of said mobile carder and for generating a corresponding serial number in the form of an identification signal;

a buffer amplifier connected to said PPM encoder for amplifying said identification signal; and an infra-red PPM signal transmitter connected to said buffer amplifier for transmitting said identification signal to said static base station, said buffer amplifier being connected also to said signal,amplifier for inhibiting said signal amplifier whilst said infra-red PPM signal transmitter is transmitting said identification signal;

wherein said static base station further comprises:

an infra-red PPM detector for detecting said identification signal from said mobile carrier;

a look-up table wherein all the enabled secret passwords are stored;

a first and a second static encryption tables, having the same configuration of said first and second encryption tables of said mobile carrier, for generating a response signal in response of said random number and of a corresponding secret password stored in said look-up table; and comparison means for comparing said identification signal received from said mobile carrier with said response signal and generating a consequent authentication signal, said comparison means generates said authentication signal solely when said identification signal and said response signal are identical.

2. An authentication system as claimed in claim 1, wherein said PPM signal decoder comprises validating means for validating said PPM signal amplified by said signal amplifier.

3. An authentication system as claimed in claim 1, wherein said random number is in the form of a 16-bit parallel data word supplied as input address to said first static encryption table and to said first encryption table of said mobile carrier and wherein the output from said second static encryption table and from said second encryption table of said mobile carder is a 16-bit parallel data word scrambled version of said random number and of the selected secret password.

4. An authentication system as claimed in claim 1, wherein said mobile carrier comprises a badge.

5. An authentication system for verifying the identity of a badge and/or the user of said badge comprising a static base station comprising:

a processor unit for generating a random number:

memory means for storing said random number and a plurality of identification numbers; and an infra-red PPM transmitter for transmitting said random number in the form of a PPM signal;

wherein said badge comprises:

an infra-red PPM signal detector for detecting said PPM signal when said badge is within the vicinity of said static base station;

a signal amplifier connected to said infra-red PPM signal detector for amplifying said PPM signal;

a PPM signal decoder connected to said signal amplifier for decoding said PPM signal in the form of said random number, said decoder comprising validating means for validating said PPM signal amplified by said signal amplifier;

a first latch for receiving said random number;

a memory wherein is stored a predetermined secret password; a first encryption table connected to said memory and to said latch for generating a first encrypted number in response to said predetermined secret password and to said random number;

a second encryption table connected to said first encryption table for generating a second encrypted number in response to said first encrypted number;

a second latch for receiving said second encrypted number;

a PPM encoder connected to said second latch for combining said second encryption number with an identification number of said badge and for generating a corresponding serial number in the form of an identification signal;

a buffer amplifier connected to said PPM encoder for amplifying said identification signal: and an infra-red PPM signal transmitter connected to said buffer amplifier for transmitting said identification signal to said static base station, said buffer amplifier being connected also to said signal amplifier for inhibiting said signal amplifier whilst said infra-red PPM signal transmitter is transmitting said identification signal;

wherein said static base station further comprises;

an infra-red PPM detector for detecting said identification signal from said badge;

a look-up table wherein all the enabled secret passwords are stored;

a first and a second static encryption tables, having the same configuration of said first and second encryption tables of said badge, for generating a response signal in response of said random number and of a corresponding secret password stored in said look-up table; and comparison means for comparing said identification signal received from said badge with said response signal and generating a consistent authentication signal, said comparison means generates said authentication signal solely when said identification signal and said response signal are identical.

6. A system as claimed in claim 5, wherein said random number is in the form of a 16-bit parallel data word supplied as input address to said first, static encryption table and to said first encryption table of said badge and wherein the output from said second static encryption table and from said second encryption table of said mobile carder is a 16-bit parallel data word scrambled version of said random number and of the selected secret password.

\* \* \* \* \*